United States Patent [19]

Canosi et al.

[11] Patent Number: 5,343,497
[45] Date of Patent: Aug. 30, 1994

[54] METHOD AND DEVICE FOR THE SYNCHRONIZATION BETWEEN A BASE RADIO STATION AND A MOBILE RADIO STATION IN A DIGITAL RADIOMOBILE SYSTEM

[75] Inventors: Claudio Canosi, Valle Salimbene; Giancarlo Rosina, Sedriano, both of Italy

[73] Assignee: Italtel Societa Italiana Telecommunicazioni S.p.A., Milan, Italy

[21] Appl. No.: 859,473

[22] PCT Filed: Dec. 20, 1990

[86] PCT No.: PCT/EP90/02296

§ 371 Date: Aug. 14, 1992

§ 102(e) Date: Aug. 14, 1992

[87] PCT Pub. No.: WO91/10305

PCT Pub. Date: Jul. 11, 1991

[30] Foreign Application Priority Data

Dec. 22, 1989 [IT] Italy .................. 22842 A/89

[51] Int. Cl.$^5$ .................. H04L 7/10; H04J 3/06
[52] U.S. Cl. .................. 375/111; 375/106; 370/100.1
[58] Field of Search .............. 375/106, 111, 114, 116; 370/93, 95.3, 100.1, 103, 105.1, 105.4, 106; 455/51.1, 54.1

[56] References Cited

U.S. PATENT DOCUMENTS

| | | | |
|---|---|---|---|
| 3,982,075 | 9/1976 | Jefferis et al. | 375/107 |
| 4,653,075 | 3/1987 | Wisniewski | 375/110 |
| 4,847,869 | 7/1989 | Labedj et al. | 375/114 |
| 4,849,991 | 7/1989 | Arnol et al. | 375/106 |
| 4,941,155 | 7/1990 | Chuang et al. | 375/106 |
| 4,977,580 | 12/1990 | McNical | 370/95.3 |
| 5,109,393 | 4/1992 | Saegusa | 375/116 |

FOREIGN PATENT DOCUMENTS 10328448 8/1989 European Pat. Off. .

Primary Examiner—Stephen Chin
Assistant Examiner—Young Tse

[57] ABSTRACT

Synchronization is provided between a mobile radio station and a base station in a digital radiomobile system TDMA where the base station transmits a timeslot containing a preset frequency sinusoid. The method samples (according to different embodiments) the baseband demodulated signals and measures the phase increases between two subsequent samplings. Increases are compared with an intermediate threshold value between 0° and 180° to construct a vector formed by a series of values, the current sum of which is calculated. The minimum value of this sum is then identified to approximately synchronize the mobile station with the timeslot containing the sinusoid. Afterwards, the frequency offset between the local oscillator frequency and the base station oscillator frequency is calculated and corrected in order to correctly identify the timeslot containing the preamble for fine synchronization. Then the decoding of the message containing the station and the frame data is performed. The device performs this method, for instance with an implementation by means of a programmed processor.

21 Claims, 4 Drawing Sheets

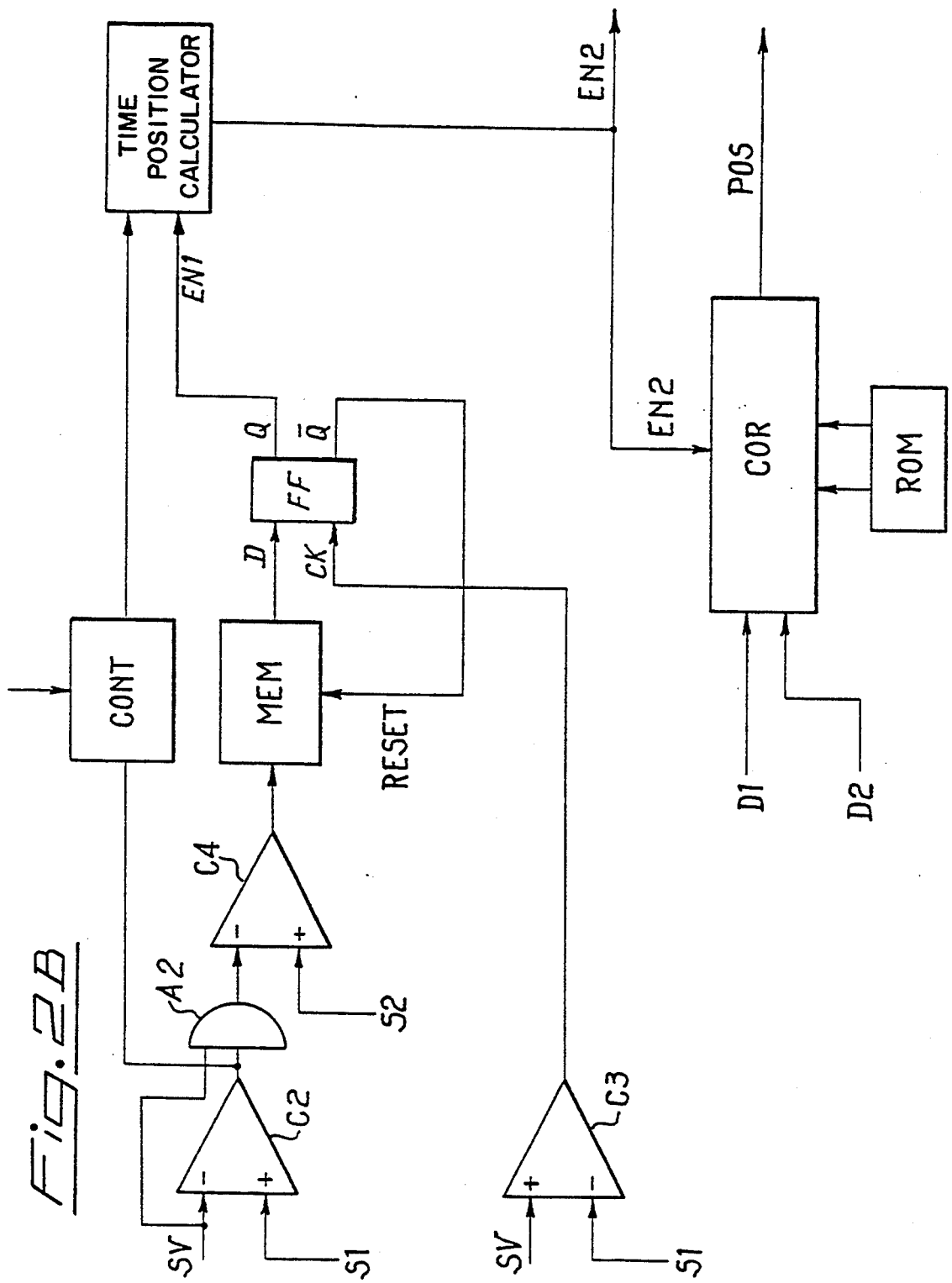

METHOD AND DEVICE FOR THE SYNCHRONIZATION BETWEEN A BASE RADIO STATION AND A MOBILE RADIO STATION IN A DIGITAL RADIOMOBILE SYSTEM

DESCRIPTION

This invention refers to the acquisition of synchronization, in the connection phase, between a generic mobile station and a base station, generally called radio base station, in a digital radiomobile system where information is transmitted according to time division multiple access (TMDA) through a phase modulation of a radiofrequency carrier wave, e.g. a MSK, GMSK and similar modulation.

BACKGROUND OF THE INVENTION

While the radio base station is usually equipped with a frequency reference and an highly accurate clock, e.g. in the range of 0.05 ppm, the local oscillator of the mobile station has a lower accuracy (0.1 ppm), mainly for cost reasons. Also, the presence of two oscillators having the same accuracy degree will ending result not practical considering the sum of errors and the error due to the Doppler effect as well.

It is therefore essential that at the start of the connection the mobile station obtains an accurate synchronization from the base station.

In SCPC (Single Carrier Per Channel) systems the problem is solved with the use of a PLL (Phase Locked Loop) or similar system (for instance a so-called Costas Loop); it is sufficient that the mobile system has a frequency not far from the base one more than the link band to be able to link and correctly demodulate the signal received.

In TDMA systems this scheme cannot be proposed since the signal is not a continuous stream, but consists of time slots separated by guard periods during which the transmitter is off and a PLL will loose the link between one slot and the other one.

U.S. Pat. No. 4,653,075 describes a bit synchronizer for a BPSK input signal having a sinusoidal carrier frequency f that is much greater than the modulation signal bit rate. The synchronizer comprises means for repetitively sampling the amplitude of the input signal over a preselected sampling interval portion of each modulating signal bit period.

In a digital radiomobile system this synchronizer cannot be proposed since the signal is very disturbed and the amplitude sampling does not obtain acceptable results.

SUMMARY OF THE INVENTION

The object of this invention is then to propose a device and a method for the synchronization of frequency and internal clock references of the mobile system with those of the base radio station, in a fast and reliable way and at limited costs.

This object is achieved performing a phase sampling instead of an amplitude sampling. The invention comprises a synchronization method between a mobile radio station and a base station in a TDMA digital radiomobile system, in which the base radio station transmits at least one timeslot containing a sinusoid having a frequency equal to 1/p of the bit transmission frequency and a timeslot containing a preamble known by the mobile station, the method comprising:

I. sub-sampling the signals demodulated in baseband with a frequency equal 1/p of the bit frequency and to measuring the phase increases between two subsequent sub-samplings;

II. comparing these increases with a first threshold value within 0° and 180°, assigning a first binary value at each threshold going over and a second binary value in the other cases;

III. constructing a vector V formed by a number n of values related to subsequent samplings, with n lower than b/p where b is the bit number of actual signal of the sinusoid;

IV. calculating the sum S of bits forming the vector V, updating the vector V and the sum S at each new sampling;

V. identifying the minimum of the function SV for the approximate synchronization of the mobile station with the timeslot containing the sinusoid;

VI. calculating the frequency offset between the local oscillator frequency and the one of the base station and correct this offset within ±1 kHz;

VII. receiving the timeslot containing the preamble (SCH) for fine synchronization and message decoding containing the data of the station and of the frame.

The invention comprises furthermore a device for synchronization between a mobile radio station and a base station in a TDMA digital radiomobile system, in which the base radio station transmits at least one timeslot containing a sinusoid having a frequency equal to ¼ of the bit transmission frequency and one timeslot containing a preamble known by the mobile station, the device comprising:

an analogue-to-digital converter pair connected to a couple of decimators at 4:1 ratio, respectively, a converter circuit equipped with conversion table, whose inputs are connected to the outputs of said decimators;

a first shift register connected to the output of the converter circuit, the output of said register being connected to a circuit for the calculation of a correction voltage for the local oscillator of the mobile radio station;

a subtractor circuit connected to the output of said converter circuit, whose output is connected to an input of a comparator whose other input is maintained at a comparative voltage;

a second shift register whose input is connected to the output of the comparator and whose single cells are connected to the same number of inputs of a multi-input adder;

means for the determination of the minimum value of the signal outgoing said adder.

Further advantageous characteristics form the subject of the depending claims.

According to the invention, for the identification and synchronization of comparative signals emitted by the base station, the signal received is used and demodulated, that is in baseband, and information suitable for the correction of the frequency offset between the radiofrequency received and the radiofrequency locally generated are obtained.

BRIEF DESCRIPTION OF THE DRAWINGS

The invention shall now be described making reference to preferred, but not limiting, implementation forms, shown in the enclosed figures, where:

FIGS. 2A and 2B show a general block diagram of the SN device according to the invention;

DETAILED DESCRIPTION

Figure 1:
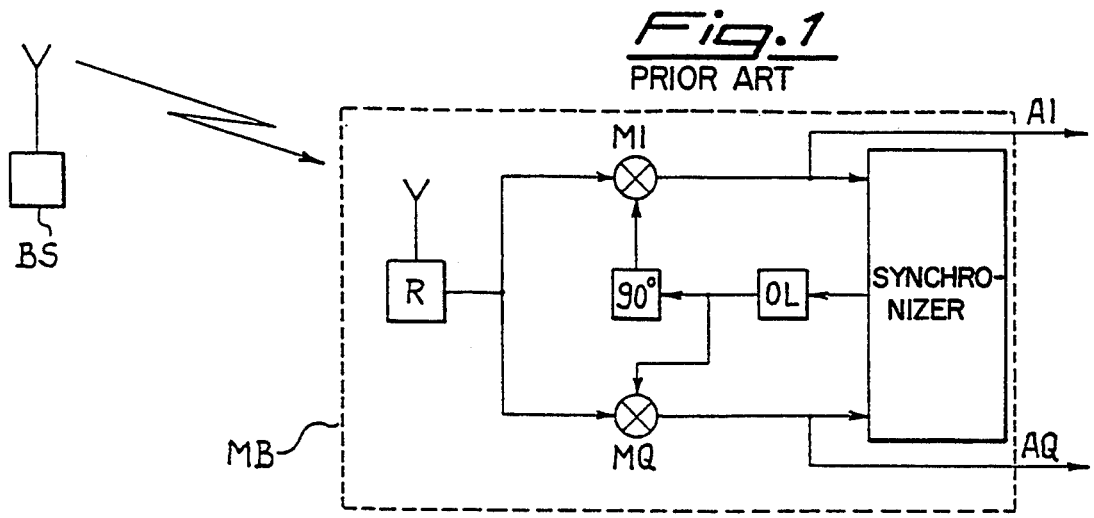
FIG. 1 shows diagrammatically the structure of the mobile station.

FIG. 1 diagrammatically shows a mobile station MB in the connection phase with a base station BS. The mobile station includes a receiver R which applies the signal received to the two mixers MI and MQ which in their turn receive at their input a frequency produced by a local oscillator OL, directly and through a 90° phase shifter, respectively. Signals in I and Q crossfooting outgoing from mixers are submitted to further processings not involving the present invention and are represented by AI and AQ arrows. Signals I and Q are also used to synchronize the oscillator OL through the block synchronizer which shall be described hereafter more in detail with reference to FIGS. 2A and 2B.

Figure 3:
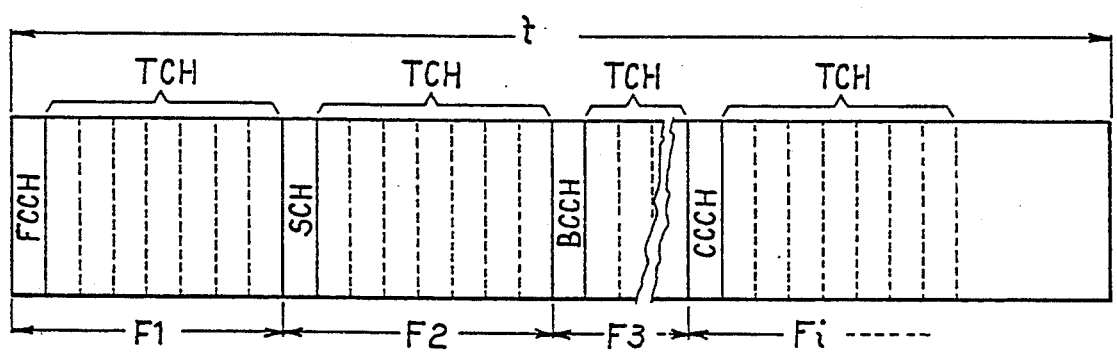
FIG. 3 shows the signal transmitted from the base station in the connection starting phase.
Figure 4:
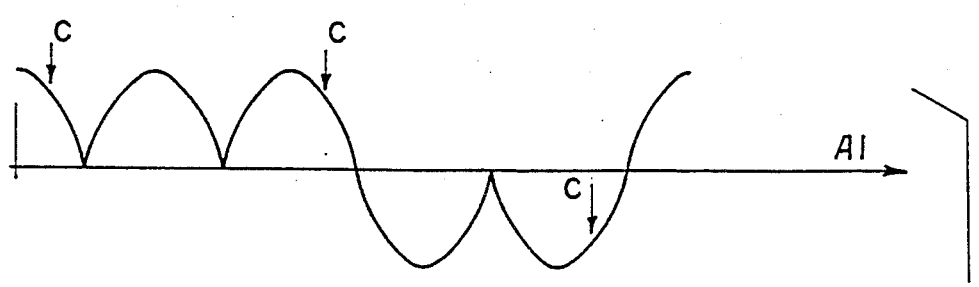
FIG. 4 shows, for comparison, two signals in base band, related to a data signal and to a sinusoidal signal respectively.
Figure 4:
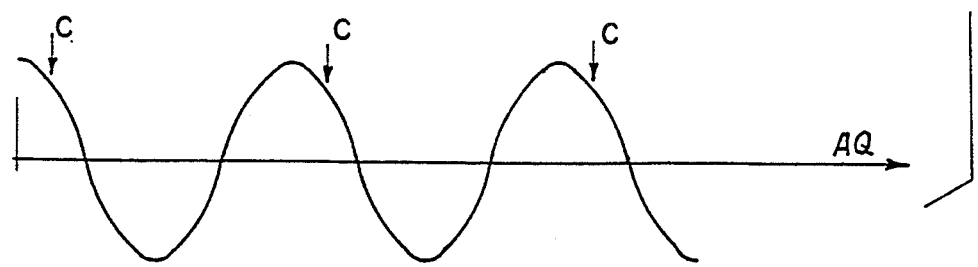
Figure 5:
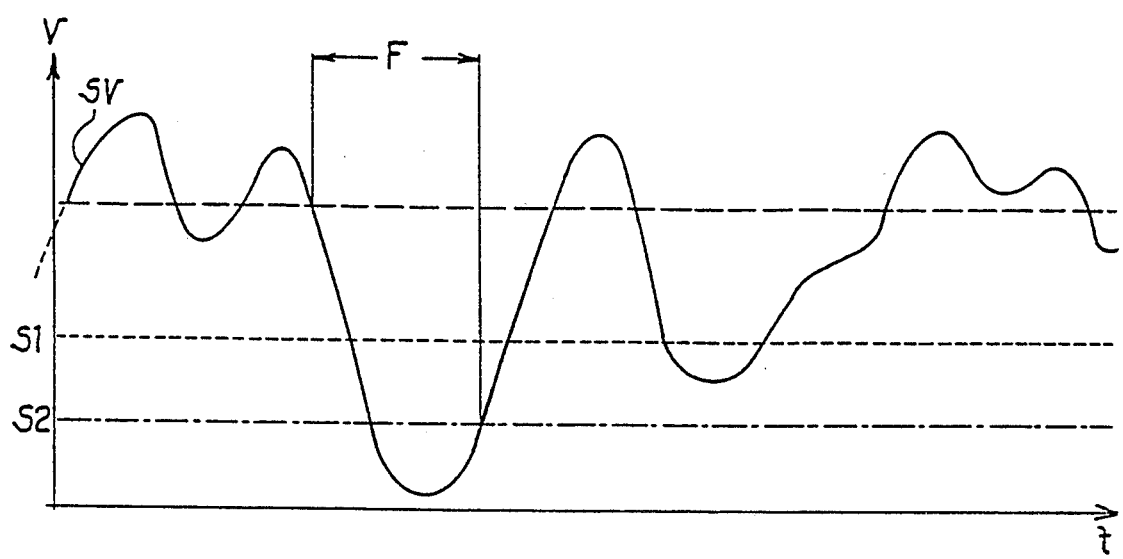
FIG. 5 is a diagram showing the sum SV function of binary values of vector V.

Referring now to FIGS. 3 to 5 the synchronization method according to the invention shall be shown.

FIG. 3 shows the structure of the TDMA signal transmitted by the base station to the mobile one, in the connection starting phase which is made up with subsequent frames F1, F2, F3 . . . , each one divided into timeslots (8 in the example shown, each lasting 577 μs, for a total duration tc of 4.62 ms).

The first timeslot is formed by the FCCH channel (Frequency Correction Channel) containing a sinusoid having a frequency equal to ¼ of the bits transmission frequency. For instance, in a system with bit frequency equal to 270.8 kbit/s, the sinusoid has a frequency of 67.7 kHz. Seven traffic channels containing the information transmitted and indicated TCH, follow the FCCH channel.

The first channel of the subsequent frame is the synchronization channel, marked SCH and containing an appropriate bit sequence (preamble), which is used for the fine synchronization (at bit level) once the link has been successful through the FCCH channel.

The signal shown in FIG. 3 includes also a BCCH channel (Broadcast Control Channel) and a CCCH channel (Common Control Channel), which are not of interest to the purposes of this invention.

At connection starting in a cell system, the mobile system examines all the radio wave carriers (124 in the GSM system) and evaluates their average power on a given timeslot. Now the mobile system tunes in the highest power carrier wave (which is theoretically the one transmitting the logic channel BCCH) and the synchronization procedure starts according to the invention. If the so identified carrier wave is of the BCCH type and the procedure is successful, the mobile station can read the data transmitted by the BCCH channel which inform if that cell is accessible or not and if it is suitable for the connection. If the mobile station cannot synchronize, or if the cell is not suitable for the connection, the procedure is repeated on the more powerful subsequent carrier waves.

The method according to the invention includes three main phases, in particular:
1. the identification of the position of the sinusoid timeslot and the coarse frame synchronization;
2. the frequency offset calculation and the correction of the local oscillator;
3. the reception of the SCH channel to obtain the fine synchronization (at bit level) and the decoding of the message containing the station and the frame data.

As already said, signals used by the method according to the invention are signals demodulated in baseband and phase shifted among them by 90°, marked with AI and AQ in FIG. 1. Therefore the signal coming from the FCCH channel contains a 67.7 kHz sinusoid, while those coming from the demodulation of the seven traffic channels TCH (and in practice also from the synchronization channel SCH) contain a modulated signal of the GMSK type, that is a MSK signal filtered with a gaussian filter.

FIG. 4 shows an example two AI and AQ demodulated signals, related to an MSK data signal and to a sinusoidal signal with a frequency equal to ¼ of the bit frequency, respectively.

The phase 1 is obtained in the following way.

A sub-sampling of AI and AQ signals, with a frequency equal to ¼ of the bit frequency is performed, in other words, a sample out of four is taken, and phase increases are measured.

Samplings are represented by arrows c in FIG. 4. The phase measurement can be obtained for instance as:

$$\Phi = \text{arctg}\,(Q/I)$$

This measure can be easily obtained with known devices directly supplying the arc tangent values and those of the module of one vector whose coordinates have been introduced at the input.

A preferred alternative solution is however to approximate the arc tangent values with a table with appropriate discretization pitch, with a considerable simplification as for hardware.

As already known, in the MSK modulation phase trends are linear, that is the phase varies in a linear manner, and therefore phase increases among samples 4 bit distant can assume only the 0° and ±180° values. In the case of GMSK signal, we can have, besides these values, also other intermediate values distributed around the abovementioned values.

On the otherhand, signals AI and AQ coming from the demodulation of the FCCH channel give two 67.7 kHz sine waves shifted between them by 90°, e.g. according to a sine and cosine function, respectively. The sub-sampling of these signals (c arrows) leads to phase skips nul in theory (being the distance between the two subsequent samplings of 360°) in lack of noise and frequency offset, and relatively small in practice. The presence of a frequency offset will lead to a constant progress or delay of the phase and therefore to increasing or decreasing increments between one sampling and the other one. As an indication, with 1 kHz frequency offset, phase differences in the range of 5° should be obtained between one sampling and the other one, and consequently it should be necessary to have an offset of about 17 kHz in order that a phase increase in the range of 90° between two subsequent samplings occurs.

We obtained therefore from sampling a series of phase increase values, e.g. equal to 40 for a FCCH timeslot containing 160 bits. These values are compared with a threshold having an intermediate value between 0° and 180°, or between 30° and 150°, e.g. 90° approx., and preferably of about 100° since this value has proved to be more suitable to discrimination in case of strong offset (in the range of 10 kHz).

Assigning value "one" in case of the threshold exceeding, and value "zero" in case the phase difference value does not exceed the threshold, a vector V is obtained formed by 0s and 1s. The observation is made for a given time with a window F, shifting compared to the timeslot, that is, in other words, the vector is constantly updated adding the new sampled value and eliminating the oldest one.

As an indication the length of the window can be in the range of 30 samples. The value of this length depends on the accuracy desired and on the time available to make calculations: the more the length is increased the more accuracy increases, but at the same time, the time required to make calculations also increases, and results have to be available at least before the subsequent sampling (current value). In the case examined the maximum limit is of 40 samples. The sum value of the vector binary values is calculated, and is updated at each sampling too. FIG. 5 shows the trend depending on the time of the curve representing the current total value SV of vector V. When this slot is timely positioned on TCH timeslots containing data, that is when all sampled bits are information bits, the sum value is considerably different from zero: e.g. assuming a random distribution of zeros and ones at 50% of information bits and one vector having a length of 30, the value of the sum will be around 15.

When the window F starts to enter the FCCH timeslot, zeros begin to systematically (or nearly) enter the vector causing the progressive decrease of the current sum value. The minimum value is obtained in the time interval during which the window remains centered on the FCCH timeslot, in which case the vector V contains the higher part of the zeros with exceptions due to noise phenomena.

Two thresholds S1 and S2, S1 being higher than S2, are preferably used for the centering discrimination. The use of two thresholds, notwithstanding the effects of statistical floatings, allows identification of the central position of the sinusoid timeslot, preventing the identification of the relative minimum, as indicated in FIG. 5 with m.

The identification procedure starts when the sum SV drops under the first threshold S1, for instance starting a counter which shall be used for the sinusoid centering. However, if the signal increases over S1, the counter is zeroed; when on the contrary it decreases even under S2 the procedure goes on since it is deemed that the minimum corresponding to the sinusoid has been identified. The use of two combined thresholds allows also to prevent the link to one sinusoid received on a channel very troubled by noise.

In this way it is possible to obtain a close approximate evaluation of the sinusoid position, which is calculated as the intermediate one between the drop point under threshold S1 and the raise one over the same threshold. The mobile station is therefore able to receive the subsequent synchronism timeslot (SCH), even if an error of some bits can still be present, which is corrected in the subsequent phase 3.

As already said, phase 2 foresees the frequency offset estimate and the correction of the local oscillator.

Using again the phase values of the sub-sampled FCCH burst, an approximate straight line is calculated (see FIG. 6) and the slope, matching with the frequency offset is evaluated. Samples dispersion is variable depending on noise and multipath conditions of the signal received, and the straight line is identified with methods of the known type, e.g. minimizing the sum of the squares of deviations of points found.

Figure 6:
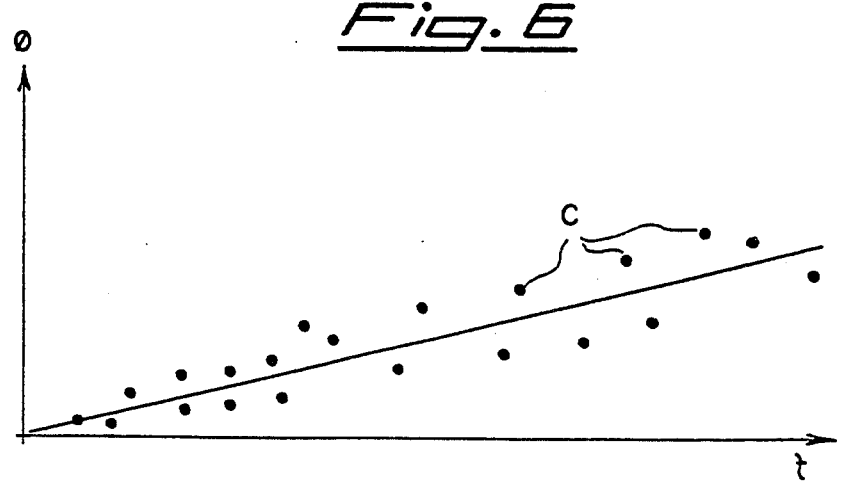
FIG. 6 shows the phase distribution of samplings for the offset determination.

In the case where an offset between the frequencies of the two oscillators exists, samples C will show an ever increasing or decreasing phase, and therefore the straight line defined by the samples shall be sloping, as shown in FIG. 6. Since the instant frequency is the derivative of the phase, the angular coefficient of this line, that is its slope, is proportional to the instant frequency and a correction voltage is obtained from the same and applied to the local oscillator OL. For calculation optimization reasons it is preferably used a number x of samples lower than the available one, e.g. 22 out of 40.

Once the offset correction is made, phase 3 can be proceeded.

Knowing the position of the synchronism timeslot SCH, where a known synchronism preamble is present, it is possible to skip to it. The presence of a certain number of guard bits at the beginning and at the end of the preamble enables easy absorption of the possible error of some bits still present in the synchronization.

Performing a complex convolution between the preamble received and the one stored at the mobile station, the link in the time is made at the data flow with an accuracy in a bit range, and in any case such to be compensated by further devices capable to correct also phase errors.

To improve the method reliability, different methods for the use of the same are possible.

As indicated, the sampling of every four bits (67.7 kHz) leave other three series of samples available on which the same method can be applied.

Final values are compared among them according to appropriate criteria allowing a decision to be reached and to obtain averaging values and therefore increasing reliability. If there is no value concordance, the link is not deemed valid.

There are different possible cases which shall be briefly described later on.

a. Use of a single set of samples, as described before in detail. The realization is simple and does not involve problems as for calculation speed, however, in some case it can originate some inaccuracies for the evaluation of the position of the sinusoid and the offset.

b. Use of a single set of samples, but meaning the values on 2 or 3 or even 4 subsequent identifications. The calculation is longer (at least the time to receive the necessary FCCH timeslots), but there is the advantage of having highly reliable estimates.

c. Use of four sets of samples which can be drawn from the signal, both for the position estimate and the offset one, based on a single identification. It has essentially the same reliability of the identification made on more subsequent samples (case b.), but allows for drawing the samples from a single timeslot and therefore it is faster. At present it is considered the preferred implementation way for the method.

d. Use of all the four sets of samples, on the basis of two or three subsequent identifications. It gives the best performance as for estimate accuracy, however calculation times and the number of operations required are high.

Figure 2A:
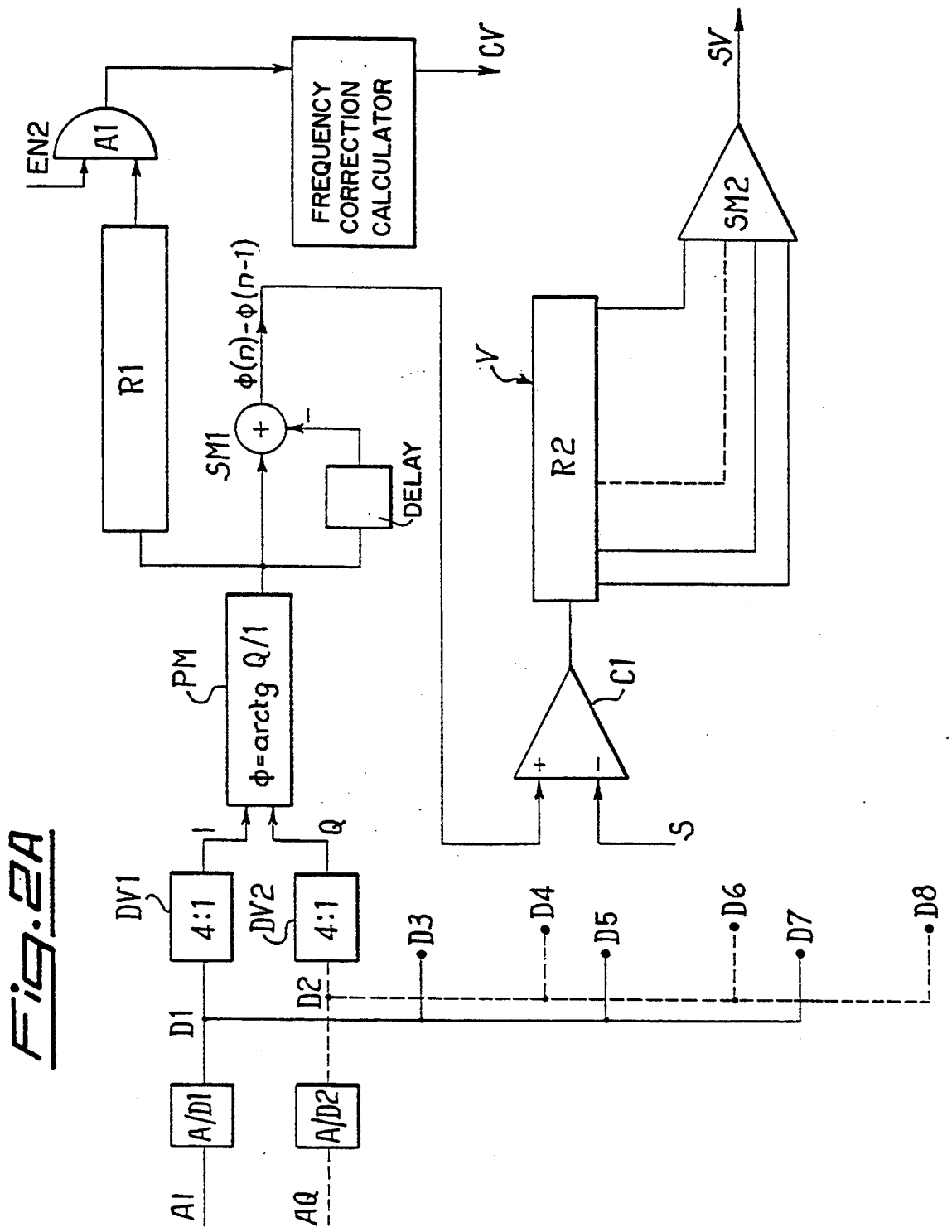

Making now reference to FIGS. 2A and 2B a form of realization of the device according to the invention shall be shown.

The device includes a pair of analogue-to-digital converters A/D1 and A/D2 converting baseband signals AI and AQ in digital signals available at terminals D1 and D2 respectively, from which signals I and Q relevant to the first series are obtained with two digital decimators DV1 and DV2 at a ratio of 4:1. Depending on the possible realization variants previously indicated, FIG. 2A shows terminals D3–D8 from which signals corresponding to other series can be taken to be subjected to processings similar to the ones described afterwards.

The converter PM, preferably realized under the table form, receives signals I and Q at two inputs and associates a phase value $\Phi$ to each pair. The output of converter PM is connected to a shift register R1, whose output is connected to a port AND A1. The other input of the port A1 is connected to an enabling signal EN2 enabling the transfer of values contained in R1 to the block frequency correction calculator for the calculation of the correction voltage CV applied to the local oscillator OL.

The output $\Phi$ is also brought to the subtractor SM1 and to the block delay to produce the phase increase values from one sampling to the subsequent one, marked $\Phi(n)-\Phi(n-1)$ in the figure. These values of phase increases are brought to the input of a comparator C1 whose reversing input is connected to a voltage S proportional to the discrimination threshold (corresponding to about 90°–100°). The comparator output is of the digital type and is progressively stored in a register R2, thus forming the vector V. The register R2 is of the shift type and with parallel access to the single cells which are connected to the inputs of an adder SM2 producing at its output the sum value of vector V, marked SV in FIG. 2A.

The output SV of the adder SM2 is connected to two comparators C2 and C3. More in detail it is connected to the inverting input of the upper threshold comparator C2 receiving at the other input the threshold value S1, and to the non inverting input of comparator C3 receiving the threshold value S1 at the other input.

C2 output enables the passage of SV through a logic port A2, towards the inverting input of a further comparator C4 which receives the lower threshold signal S2 at the other input. C2 output is connected to the counter input COUNT supplied by clock pulses CK and whose output is connected to a unit time position calculator receiving also at its input an enabling signal EN1 available at the output of a bistable circuit FF of the D type.

The time position calculator unit has the function to calculate the time position of the FCCH slot on the basis of the search for the minimum value of function SV. Following the detection of this minimum value, the time position calculator unit generates a second output enabling signal EN2 which is brought to a correlation circuit COR, receiving on the other inputs signals D1 and D2 respectively, and the content of a memory ROM where a reference digital signal (preamble) is stored. The output POS of the correlation circuit has the function to synchronize the mobile station on the frame of the base station.

The output of C4 is connected to a buffer memory MEM whose output comes on the input D of the bistable circuit FF receiving at the CK input the output of comparator C3. The inverse output of the FF unit acts as reset for the MEM block.

The device can be also implemented through a programmed processor to accomplish the functions shown.

The invention has been described in detail with reference to the preferred, but not limiting, realization forms, however it must not be considered limited to these examples, but it covers the different variants and modifications which shall become clear to the technicians of this field.

We claim:

1. A method for the synchronization between a mobile radio station having a local oscillator, oscillating at a local oscillator frequency, and a base station in a digital radiomobile system, where the base station transmits a signal including modulated bits transmitted at a bit transmission frequency, in at least a first timeslot, a sinusoid having a frequency equal to 1/p, p being an integer, of the bit transmission frequency and in a second timeslot a preamble known by the mobile station, comprising the steps of:
   (a) demodulating said signal to produce a demodulated signal;
   (b) sampling the demodulated signal with a frequency equal to 1/p of the bit transmission frequency to produce samplings and measuring the phase increases between two samplings;
   (c) comparing said phase increases with a first threshold value, assigning a first binary value to each or said phase increases when an increase is larger than said first threshold value and assigning a second binary value when an increase is not larger than said first threshold value;
   (d) constructing a vector formed with a number n, n being an integer, of said binary values assigned to each of said phase increases;
   (e) calculating the sum of said number n of said binary values forming the vector and updating the vector and the sum at each new sampling;
   (f) identifying a minimum of a function of the sum with respect to time;
   (g) calculating a frequency offset of the local oscillator frequency as a function of the identified minimum.

2. The method according to claim 1, wherein the frequency offset is obtained as the slope of straight line which approximates an average of the phase increases of the sampled demodulated signal over time.

3. The method according to claim 1 or 2, wherein p is equal to four.

4. The method according to claim 2 wherein the phase increases are determined as a result of a correspondence table.

5. The method according to claim 4, wherein a single set of samples is used and further including a step of averaging the samples on several subsequent identifications.

6. The method according to claim 5, wherein step (b) includes sampling four sample groups on a same timeslot.

7. The method according to claim 4, wherein step (b) includes sampling four sets of samples from the demodulated signal for position and offset evaluation.

8. The method according to claim 1, wherein said first threshold value is a value between 30° and 150°.

9. The method according to claim 8, wherein said first threshold value is about 100°.

10. The method according to claim 1, wherein step (a) includes demodulating said signal to produce a demodulated baseband signal.

11. The method according to claim 1, wherein step (d) includes constructing a vector formed with a number n of said binary values assigned to each of said phase increases, wherein n is lower than b/p where b is the number of bits transmitted in a timeslot.

12. The method of claim 1 wherein step (g) includes adjusting the local oscillator in response to the calculated frequency offset to correct this offset within plus or minus one kilohertz.

13. The method of claim 1, further including the steps of:
 (i) receiving the preamble for fine synchronization and obtaining a message for decoding the signal, the message containing station and frame data.

14. The method according to claim 1, wherein the base station transmits a signal in time division multiple access form.

15. A device for the synchronization of a mobile radio station including a local oscillator oscillating at a local oscillator frequency and a base station in a digital radiomobile system where the base station transmits modulated bit values transmitted at a bit transmission frequency and at least in a first timeslot, a sinusoid having frequency equal to ¼ of the bit transmission frequency and in a second timeslot a preamble known by the mobile station, the device comprising:
 a converter circuit including a conversion table outputting a phase value;
 a first shift register connected to the output of said converter circuit, the output of said register being connected to a circuit for the calculation of a correction voltage for the local oscillator of the mobile radio station;
 a subtractor circuit connected to the output of the converter circuit for subtracting a first phase value from a second phase value output from the converter circuit, whose output is connected to the input of a comparator whose other input is a reference voltage;
 a second shift register whose input is connected to the output of said comparator, including cells, each being connected to an input of a multi-input adder;
 means for the determination of the minimum value of the signal outgoing said adder over a period of time.

16. The device according to claim 15, wherein the means for the determination of the minimum value includes comparators, each having an input kept at preset 17. The device according to claim 15, wherein the first phase value and the second phase value subtracted by said subtractor circuit are output from the converter successively in time.

18. The device of claim 15, wherein the circuit for the calculation of a correction voltage is responsive to the determination means.

19. The device of claim 18 wherein the circuit includes means for calculating the slope of a straight line which approximates an average of the phase of a sampled demodulated signal over time.

20. An apparatus for synchronizing a mobile radio station having a local oscillator, oscillating at a local oscillator frequency, and a base station in a digital radio system, where the base station transmits a signal including modulated bits transmitted at a bit transmission frequency, in at least a first timeslot, a sinusoid having a frequency equal to 1/p, p being an integer, of the bit transmission frequency and in a second timeslot a preamble known by the mobile station, the apparatus comprising:
 a demodulator, demodulating said signal to produce a demodulated signal;
 a sampler, sampling the demodulated signal with a frequency equal to 1/p of the bit transmission frequency to produce samplings;
 a measurer, measuring the phase increases between two samplings;
 a comparator, comparing the phase increases with a first threshold value and assigning a first binary value to each of the phase increases when an increase is larger than the first threshold value and assigning a second binary value when an increase is not larger than the first threshold value;
 a register, storing a vector formed with a number n of said binary values assigned to each of said phase increases, n being an integer;
 an adder, summing the n binary values stored in said register creating a sum, and updating the sum at each new sampling;
 means for identifying a minimum of a function of the sum with respect to time;
 means for calculating a frequency offset of the local oscillator frequency responsive to the identifying means.

21. The apparatus of claim 20, wherein the means for calculating a frequency offset calculates the slope of a straight line which approximates an average of the phase increases of the sampled demodulated signal over time.

* * * * *